(12) United States Patent
Shah et al.

(10) Patent No.: US 10,590,903 B2
(45) Date of Patent: Mar. 17, 2020

(54) SPARK PLUG CONDITION MONITORING

(71) Applicant: Caterpillar Energy Solutions GmbH, Mannheim (DE)

(72) Inventors: Darshit Shah, Mannheim (DE); Heiko Lenhardt, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 226 days.

(21) Appl. No.: 15/715,428

(22) Filed: Sep. 26, 2017

(65) Prior Publication Data
US 2018/0100479 A1  Apr. 12, 2018

(30) Foreign Application Priority Data

Oct. 7, 2016  (EP) .................................... 16192900

(51) Int. Cl.
| | |
|---|---|
| *F02P 17/00* | (2006.01) |
| *G01M 15/00* | (2006.01) |
| *F02P 17/12* | (2006.01) |
| *H01T 13/60* | (2011.01) |
| *F02P 5/152* | (2006.01) |
| *G01M 15/11* | (2006.01) |
| *F02B 19/12* | (2006.01) |
| *F02D 35/02* | (2006.01) |

(52) U.S. Cl.
CPC .............. *F02P 17/12* (2013.01); *F02B 19/12* (2013.01); *F02P 5/152* (2013.01); *G01M 15/11* (2013.01); *H01T 13/60* (2013.01); *F02D 35/027* (2013.01); *F02D 2200/1015* (2013.01); *F02P 2017/121* (2013.01); *F02P 2017/123* (2013.01); *Y02T 10/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,449,100 | A * | 5/1984 | Johnson | F02P 17/00 324/378 |
| 5,241,937 | A * | 9/1993 | Kanehiro | F02P 17/12 123/406.27 |
| 5,322,045 | A * | 6/1994 | Hisaki | F02P 17/12 123/406.14 |
| 5,418,461 | A * | 5/1995 | Maeda | F02P 17/12 123/479 |

(Continued)

FOREIGN PATENT DOCUMENTS

| | | |
|---|---|---|
| DE | 2752244 A1 | 6/1979 |
| DE | 102008041386 A1 | 2/2009 |

(Continued)

*Primary Examiner* — Andre J Allen

(57) ABSTRACT

A method for monitoring an ignition system including a spark plug of an internal combustion engine is disclosed. The method comprises determining an operation value associated with an electrical parameter indicative of an operation of the ignition system during actuation of the spark plug. The method further comprises determining at least one parameter indicative of a current engine operation condition of the internal combustion engine, and determining a current spark plug state of the spark plug based on the at least one engine parameter and the operation value associated with the electrical parameter of the ignition system.

20 Claims, 4 Drawing Sheets

(56) References Cited

U.S. PATENT DOCUMENTS

| | | | |
|---|---|---|---|
| 5,493,227 A * | 2/1996 | Shimasaki | F02P 17/12 |
| | | | 324/378 |
| 6,054,859 A * | 4/2000 | Takahashi | F02P 17/12 |
| | | | 324/399 |
| 7,533,651 B2 | 5/2009 | Surnilla | |
| 9,249,774 B2 | 2/2016 | Huberts et al. | |
| 2005/0022776 A1 * | 2/2005 | Montgomery | F02D 41/008 |
| | | | 123/295 |
| 2007/0215101 A1 * | 9/2007 | Russell | F02P 15/02 |
| | | | 123/310 |
| 2007/0215130 A1 | 9/2007 | Shelby et al. | |
| 2008/0007266 A1 | 1/2008 | Enomoto et al. | |
| 2011/0247598 A1 * | 10/2011 | Tanaya | F02P 17/12 |
| | | | 123/594 |
| 2012/0247441 A1 | 10/2012 | Schultz | |
| 2015/0340846 A1 | 11/2015 | Schultz et al. | |
| 2016/0138553 A1 | 5/2016 | Senior et al. | |

FOREIGN PATENT DOCUMENTS

| | | |
|---|---|---|
| EP | 0654604 A1 | 5/1995 |
| FR | 2768186 A1 | 3/1999 |

* cited by examiner

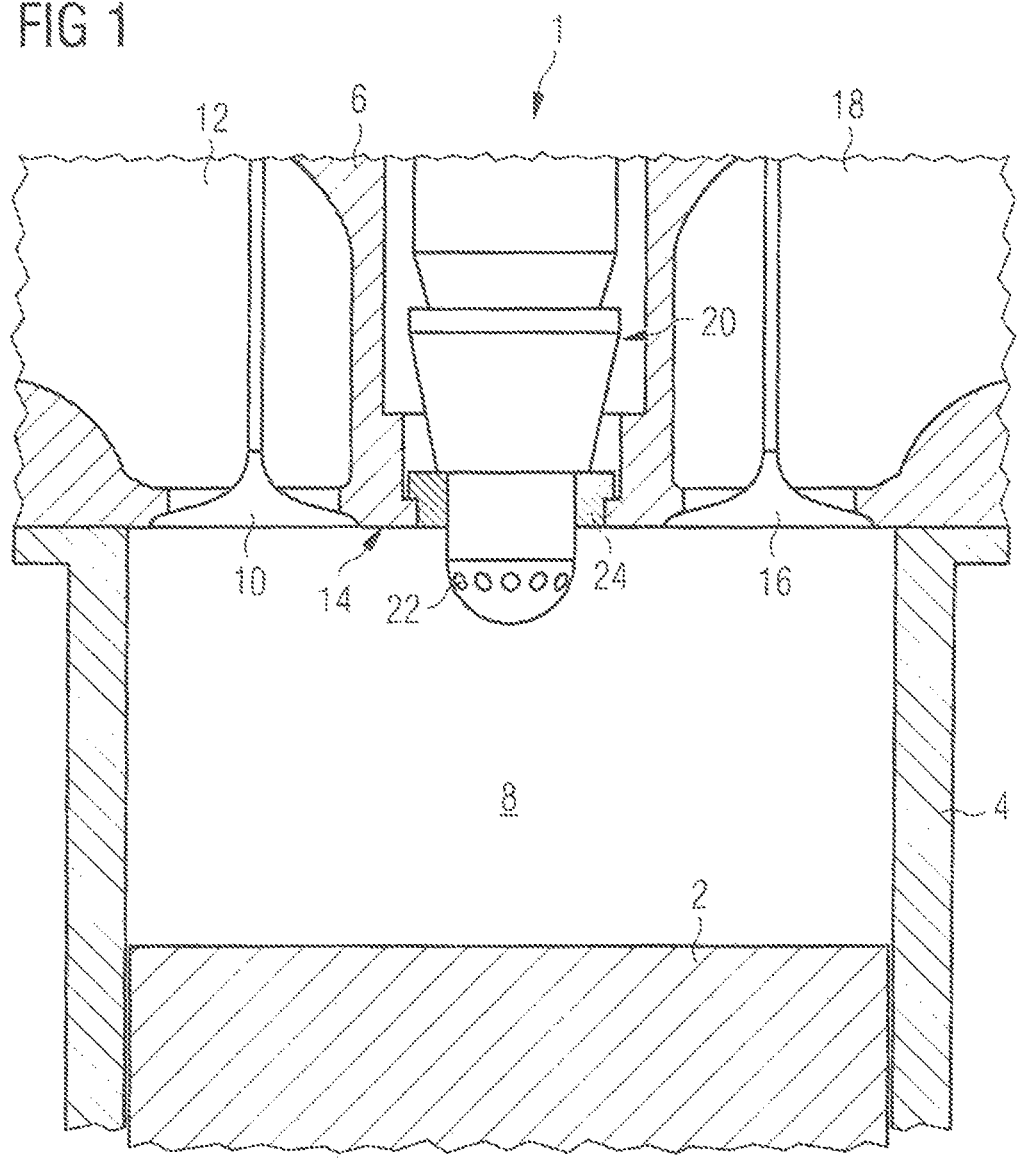

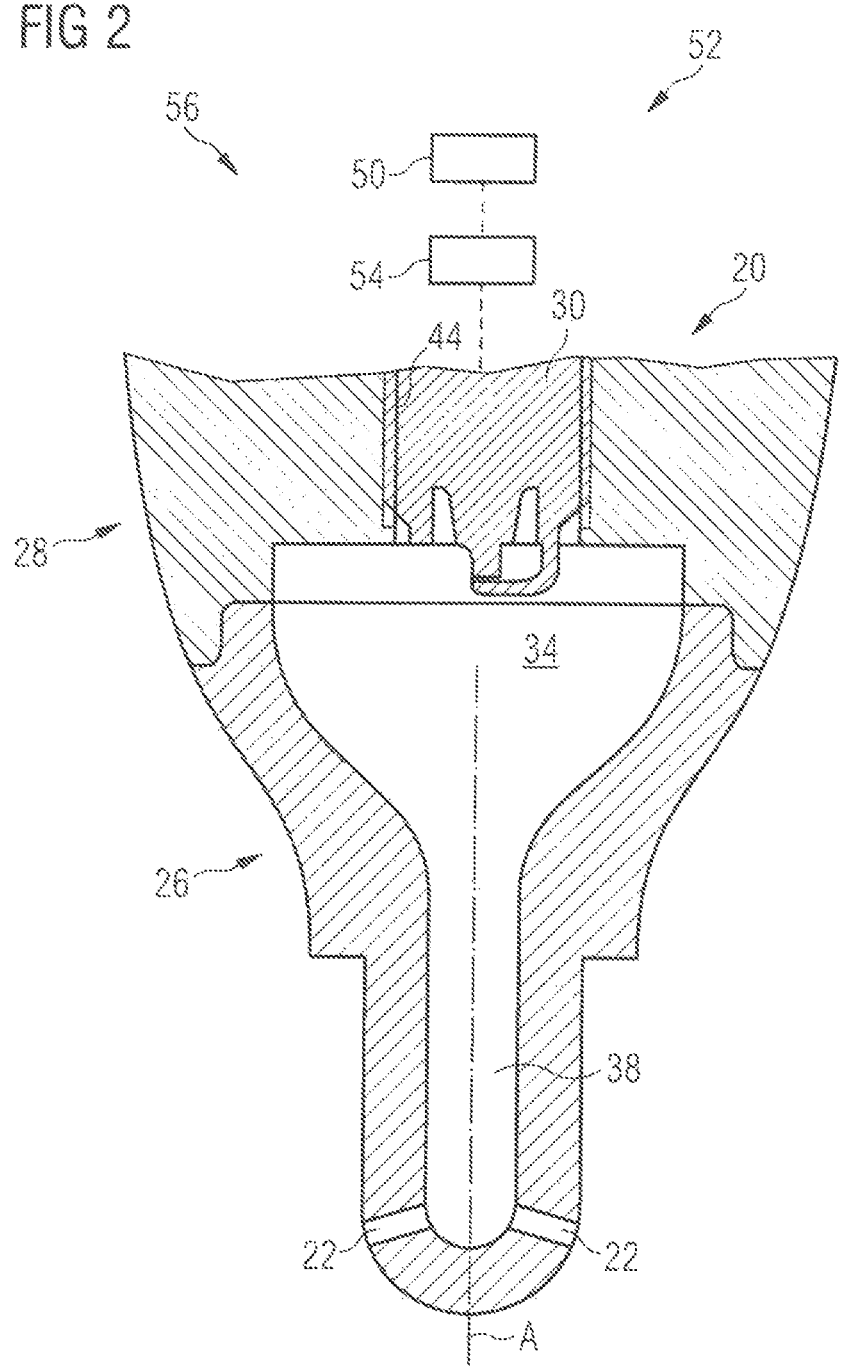

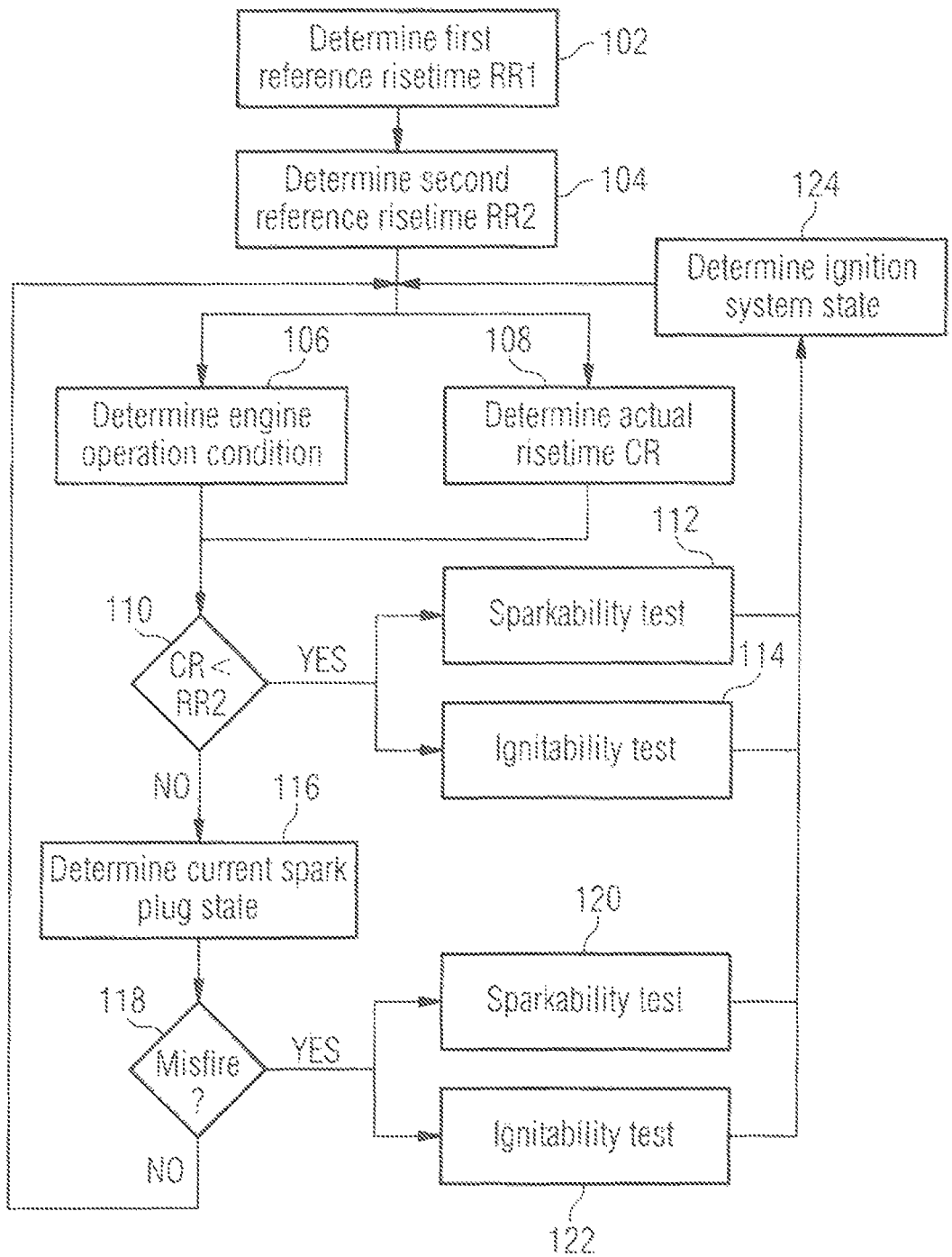

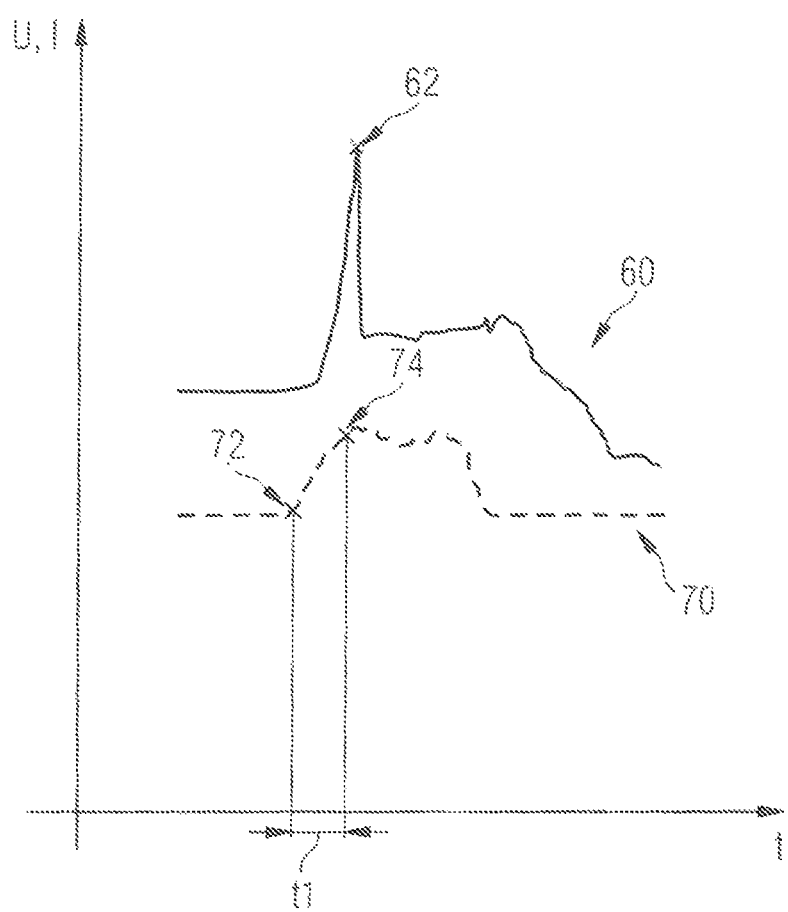

SPARK PLUG CONDITION MONITORING

TECHNICAL FIELD

The present disclosure generally relates to an internal combustion engine. More particularly, the present disclosure relates to a method for monitoring a spark plug, and a related control system for an internal combustion engine.

BACKGROUND

Operating cycles, in which no combustion occurs, are termed as misfired cycles. Internal combustion engines may suffer from misfire for various reasons. Misfire can be caused by a malfunction of the ignition system. Alternatively, the mixture of fuel and air may be inappropriate, for example, due to insufficient fuel feed or an excess of fuel in the fuel air mixture. As an undesired consequence of misfire, unburnt fuel may build up in the exhaust passages of the internal combustion engine. This can lead to explosions and potential damage to the engine.

An exemplary system for monitoring an ignition system is disclosed in DE 10 2008 041 386 A1. A controller has a current detection mechanism for detecting secondary current flowing between electrodes of an ignition plug in a condition in which ignition voltage is provided between the electrodes. An ignition detection mechanism detects a sequence of ignition if the secondary current detected by the current detection mechanism is equal to or larger than a preset reference current value, continues for a preset reference time, and detects malfunctioning of the ignition if the duration of the detection is smaller than the reference time.

The present disclosure is directed, at least in part, to improving or overcoming one or more aspects of prior systems.

SUMMARY OF THE DISCLOSURE

In one aspect, a method for monitoring an ignition system including a spark plug of an internal combustion engine is disclosed. The method comprises determining an operation value associated with an electrical parameter indicative of an operation of the ignition system during actuation of the spark plug. The method further comprises determining at least one parameter indicative of a current engine operation condition of the internal combustion engine. The method further comprises determining a current spark plug state of the spark plug based on the at least one engine parameter and the operation value associated with the electrical parameter of the ignition system.

For example, the electrical parameter may be a current strength of a secondary current of an ignition coil of the ignition system, a current risetime duration of a primary current of the ignition coil, and/or a secondary breakdown voltage of a secondary voltage of the ignition coil.

In another aspect, an ignition system for an internal combustion engine is disclosed. The ignition system comprises at least one spark plug, an ignition coil for the at least one spark plug, and a control unit electronically connected to the ignition coil and configured to perform a method according to the above aspect.

In yet another aspect, a computer program is disclosed. The computer program comprises computer-executable instructions which, when run on a computer, cause the computer to perform the steps of the method according to the above aspect.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 1 shows a schematic cut view through a portion of an internal combustion engine that is equipped with a pre-chamber;

FIG. 2 shows a schematic cut view through an exemplary pre-chamber assembly including a spark plug;

FIG. 3 shows a method for monitoring an ignition system according to the present disclosure; and FIG. 4 shows schematic graphs of exemplary electrical parameters of a spark plug during actuation of the same.

DETAILED DESCRIPTION

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that it is possible to determine a current spark plug (wear) state in real time during operation of the internal combustion engine. The determination of the current spark plug state is based on a determined operation value of an electrical parameter indicating an operation of the ignition system during actuation of the spark plug. The determination of the current spark plug state is further based on the current engine operation condition, for example engine speed, engine load, pressure level, current ignition angle etc. For example, a risetime duration of a primary current of an ignition coil of an ignition system increases during service life of the spark plug under the same engine operation conditions, because the electrode wear of the spark plug increases. For example, formation of deposits may occur, a gap between the electrodes may increase, and/or melting pearls may form. Accordingly, in a very simple example, an increased risetime duration for equal (or same) engine operation conditions may indicate an increased wear state of the spark plug.

Particularly, the current spark plug state may be determined based on a map stored in a control unit of the internal combustion engine. The mapping may provide a plurality of empirically determined spark plug states. Each of these spark plug states depends on the specific combination of engine operation conditions and the operation value of the electrical parameter associated with the operation of the spark plug.

The present disclosure is further based in part on the realization that a current risetime duration of a primary current of an ignition coil of the ignition system is particularly suitable for use as the electrical parameter associated with the operation of the spark plug. The current risetime duration can be determined from an ignition driver of the spark plug on the primary side of the transformer of the spark plug without any additional equipment.

The present disclosure is further based in part on the realization that a preset spark plug test procedure can be performed in case an abnormal behavior of the combustion process and/or the spark plug is detected. Such an abnormal behavior may relate to a determination that misfire occurs. On the other hand, such an abnormal behavior may relate to a situation, in which a comparison of a reference value and the operation value of the electrical parameter associated with the operation of the spark plug indicates an abnormal behavior of the spark plug. The preset spark plug test procedure may include a sparkability test for testing the ability of the spark plug to generate a spark for the given operating condition and with the given ignition system configuration, and an ignitability test for testing the ignitability of the fuel air mixture at a given operating point.

The present disclosure is further based in part on the realization that the reference value may be determined during optimal sparking conditions for the spark plug. For example, the reference value may be determined before normal operation of the internal combustion engine. Specifically, the reference value may be determined during a starting procedure of the internal combustion engine, in which no fueling and combustion occurs and the engine is driven by the starter motor. In such a situation, the pressure level and density in between the electrodes of the spark plug are relatively low compared to a usual operation condition, and thus, a spark between the electrodes of the spark plug can be generated relatively easy.

Referring now to the drawings to explain the general principle of the present disclosure by way of example. FIG. 1 depicts a piston 2 arranged in a cylinder 4 of a portion of an internal combustion engine 1 (not shown in further detail). The cylinder 4 is covered by a cylinder head 6. The piston 2, the cylinder 4, and the cylinder head 6 together define a main combustion chamber 8 of the internal combustion engine 1. The piston 2 is reciprocatingly arranged in the cylinder 4 to move between a top dead center (TDC) and a bottom dead center (BDC) during operation of the internal combustion engine 1.

For the purpose of describing exemplary embodiments of the present disclosure, the internal combustion engine 1 is considered as a four-stroke stationary or marine internal combustion engine operating at least partly on gaseous fuel such as a gaseous fuel engine or a dual fuel engine. One skilled in the art will appreciate, however, that the internal combustion engine may be any type of engine (turbine, gas, diesel, natural gas, propane, two-stroke, etc.) that would utilize the spark plug diagnostics as disclosed herein. Furthermore, the internal combustion engine may be of any size, with any number of cylinders, and in any configuration (V-type, in-line, radial, etc.). Moreover, the internal combustion engine may be used to power any machine or other device, including locomotive applications, on-highway trucks or vehicles, off-highway trucks or machines, earth moving equipment, generators, aerospace applications, marine applications, pumps, stationary equipment, or other engine powered applications. The internal combustion engine 1 may use a pre-mixed fuel air mixture supplied to the cylinder 4 via inlet channels, or may directly inject a fuel into the cylinder 4.

The cylinder head 6 includes at least one inlet valve 10, for example a poppet valve. The inlet valve 10 is accommodated in an inlet channel 12 opening in a piston sided face 14 of the cylinder head 6 for supplying a mixture of gaseous fuel and air into the main combustion chamber 8. Similarly, at least one outlet valve 16, for example also a poppet valve, is accommodated in an outlet channel 18 of the cylinder head 6 to guide exhaust gas out of the main combustion chamber 8.

The cylinder head 6 further comprises a pre-chamber assembly 20 A plurality of flow transfer channels 22 fluidly connect the main combustion chamber 8 with an interior of the pre-chamber assembly 20 (not visible in FIG. 1).

The pre-chamber assembly 20 is installed in the cylinder head 6 via a mounting body 24 as shown in FIG. 1. Alternatively, the pre-chamber assembly 20 may be installed in the cylinder head 6 in any other fashion.

Referring to FIG. 2, the pre-chamber assembly 20 is shown in a schematic sectional view. The pre-chamber assembly 20 includes a first pre-chamber body 26, a second pre-chamber body 28, and a spark plug 30. In some embodiments, the pre-chamber assembly 20 may further comprise a fuel supply device for enriching a pre-chamber 34 of the pre-chamber assembly 20.

The first pre-chamber body 26 and the second pre-chamber body 28 are connected to one another. The spark plug 30 is accommodated in the second pre-chamber body 28

The first pre-chamber body 26 includes and defines the pre-chamber 34, a riser channel 38 and the flow transfer channels 22. In an assembled state, the flow transfer channels 22 fluidly connect an interior of the pre-chamber body 26 (the pre-chamber 34 and the riser channel 38) and the main combustion chamber 8 (FIG. 1).

The pre-chamber 34 extends along a longitudinal axis A of the first pre-chamber body 26, is funnel-shaped, and tapers in direction to the riser channel 38. Alternatively, the pre-chamber 34 may have any other shape such as a cylindrical shape, pyramidal shape, conical shape, and combinations thereof. For example, the pre-chamber 34 may have a volume within a range between 0.1% and 10% of the compression volume of the cylinder 4 (see FIG. 1).

The spark plug 30 is installed in the pre-chamber assembly 20 so that the spark plug 30 is operably coupled to the pre-chamber 34. Particularly, electrodes of the spark plug 30 may reach into the pre-chamber 34 so that a spark between the electrodes ignites a mixture in the pre-chamber 34.

In some embodiments, a pre-chamber 34 may be omitted and/or the spark plug 30 may reach into the main combustion chamber 8 of the internal combustion engine 1. For example, the spark plug 30 may be a main combustion chamber spark plug, a pre-chamber spark plug, a chamber plug (including an integrated chamber for shielding the electrodes), a ring-type spark plug, a j-type spark plug, etc.

An ignition system 56 includes a control unit 50, an ignition coil 54, and the spark plug 30. In some embodiments, the ignition coil 52 may be integrated into the spark plug 30.

The control unit 50 is electronically connected to the ignition coil 54 which in turn is electronically connected to the spark plug 30. The control unit 50 is configured to actuate the ignition system 56. The control unit 50 may be further configured to adapt an operation of the internal combustion engine 1, for example adapting an engine speed, adapting a charge air pressure, adapting a fuel supply, adapting a timing of a fuel supply and an ignition, etc. The control unit 50 and/or the ignition system 56 may be a part of a control system 52 further including the electrical connections to the components.

The control unit 50 may be a single microprocessor or multiple microprocessors that include means for controlling, among others, an operation of various components of the internal combustion engine 1. The control unit 50 may be a general engine control unit (ECU) capable of controlling the internal combustion engine 1 and/or its associated components or a specific engine control unit dedicated to the ignition system 56. The control unit 50 may include all components required to run an application such as, for example, a memory, a secondary storage device, and a processor such as a central processing unit or any other means known in the art for controlling the internal combustion engine 1 and its components. Various other known circuits may be associated with the control unit 50, including power supply circuitry, signal conditioning circuitry, communication circuitry and other appropriate circuitry. The control unit 50 may analyze and compare received and stored data and, based on instructions and data stored in memory or input by a user, determine whether action is required. For example, the control unit 50 may compare received values with target values stored in memory, and, based on the results of the comparison, transmit signals to one or more components to alter the operation status of the same.

The control unit 50 may include any memory device known in the art for storing data relating to an operation of the internal combustion engine 1 and its components. The data may be stored in the form of one or more maps (mappings). Each of the maps may be in the form of tables, graphs and/or equations, and may include a compilation of data collected from lab and/or field operation or simulations of the internal combustion engine 1. The maps may be generated by performing instrumented tests on the operation of the internal combustion engine 1 under various operating conditions while varying parameters associated therewith or performing various measurements. The control unit 50 may reference these maps and control operation of one component in response to the desired operation of another component. For example, the maps may contain empirical data on the spark plug state depending on a specific combination of an operation value of an electrical parameter of the spark plug 30 and operating conditions of the internal combustion engine 1.

The control unit 50 is further configured to perform the control methods as disclosed herein, in particular, the control method as described in the following with respect to FIGS. 3 and 4.

In the following, an exemplary method for monitoring and evaluating a (wear) state of the spark plug 30 is described. The exemplary method uses a current risetime duration of a primary current of the ignition coil 54 of the ignition system 56 as an electrical parameter indicating the operation and operability of the spark plug 30. It was found that using said current risetime duration is particularly suitable for the present application. The reason is that the current risetime duration can be read out directly from the ignition driver without requiring special equipment. However, it is noted that other electrical parameters can be used analogous to the current risetime duration as described. In some embodiments, additionally or alternatively, for example, a secondary voltage, a secondary current, a primary voltage, ion sensing, etc. may be used.

In FIG. 4, exemplary electrical parameters associated with an operation of the spark plug 30 are depicted in a common diagram. The diagram has a time axis as abscissa, and the ordinate refers to a current strength and (not needed), respectively. A graph 60 indicates an exemplary development of a secondary voltage during actuation of the spark plug 30. At a secondary breakdown voltage 62, which is a maximum secondary voltage, a spark is generated. A graph 70 indicates an exemplary development of a primary current during actuation of the spark plug 30. FIG. 4 further indicates an exemplary current risetime duration t1 of the primary current. The current risetime duration t1 is defined as time period between reaching a first predefined current level 72, which may be (about) a start of current rise 72 of the primary current development 70, and reaching a second predefined current level 74, which may be about an end of rising (a maximum) of the primary current development 70, during actuation of the spark plug 30. It is noted that the end of the risetime duration t1 does not necessarily correspond to point in time of the preset maximum current of the primary current development. Instead, depending on operating conditions and control settings, it may be before, at, or after a maximum current. At some point of time, the secondary voltage applied at the electrodes of spark plug 30 is high enough to generate a spark between the electrodes of the spark plug 30 (indicated by the secondary breakdown voltage 62).

Specifically, owing to increase in current, a magnetic field is generated at the primary side of the ignition coil 54. This induces a secondary magnetic field and as a result generates a very high secondary voltage depending on the coil configuration. During this change in current, at some point of time, the secondary voltage may be large enough to ionize the gas in between the two electrodes of the spark plug 30 and lead to a breakdown. Once the spark is generated, the secondary voltage drops drastically as not much voltage is required to sustain the spark.

In the following, current risetime durations during different operation modes are discussed, namely reference risetime duration RR1, reference risetime duration RR2, and actual (present) risetime duration CR. Each of those risetime durations RR1, RR2, and CR refers to the time period t1 shown in FIG. 4 for different operating conditions of the internal combustion engine 1 as described in detail below.

The exemplary method shown in FIG. 3 starts with step 102, in which the first reference risetime duration RR1 is determined. The first reference risetime duration RR1 is determined during an engine prestart operation mode of the internal combustion engine 1. During engine prestart, the internal combustion engine 1 is not yet running (neither a starting devices drives the internal combustion engine 1 nor a combustion in the combustion chambers of the internal combustion engine 1 occurs). In other words, no compression occurs in the cylinder 4 during the engine prestart. The engine prestart is used to prepare the internal combustion engine 1 for operation, for example, by pre-lubricating the moving components.

The first reference risetime RR1 may be used to check whether the ignition system 56 is intact and functional. For example, the first reference risetime RR1 may be compared to a preset reference value stored in the control unit 50. Additionally, the first reference risetime RR1 may be used to check whether the ignition coil 54 is in acceptable operating regime, for example, by comparing the first reference risetime RR1 to a base value stored in the control unit 50. Further, the first reference risetime RR1 may be used to check the ageing of the ignition coil 54 over time by comparing it to a predefined map stored in the control unit 50.

The first reference risetime duration RR1 is determined for each cylinder 4 separately. The plurality of determined first reference risetime durations RR1 is saved in a memory for further processing, for example by control unit 50.

Then, during an engine purge operation mode of the internal combustion engine 1, a second reference risetime duration RR2 is determined in step 104. In the engine purge operation mode, the internal combustion engine is driven by the starting device, for example, to purge inlet channels, combustion chambers and outlet channels. During the engine purge operation mode, the pistons reciprocate and a compression of the combustion chambers occurs. The second reference risetime duration RR2 determined during the engine purge operation mode is considered as a quasi-optimal operation risetime duration of the ignition system 56. The reason is that the density in between the electrodes of the spark plug 30 is lower than in normal operation of interest, because during the engine purge operation mode no fueling (and no combustion) occurs. During normal operation, risetime durations being longer than the second reference risetime duration RR2 can be expected if no failure of the spark plug 30 etc. occurs.

Said engine purge operation mode may be particularly used for large internal combustion engines. Typically, those large internal combustion engines have a rated power output of more than 50 kW, particularly 80 kW, per cylinder 4 and, for example, run on marine vessels or as drive sources of stationary power plants.

The second reference risetime duration RR2 is determined for each cylinder 4 separately. The plurality of determined second reference risetime durations RR2 is saved in a memory for further processing, for example by control unit 50.

After the engine purge operation mode, the internal combustion engine 1 transitions into a normal operation mode, in which the internal combustion engine 1 is driven by combustion of a fuel air mixture.

During normal operation mode of the internal combustion engine 1, the engine operation conditions are constantly measured and/or determined (step 106). For example, parameters indicating the current engine operation condition are intake air pressure, in-cylinder pressure, load, engine speed, intake air temperature, power output, gas quality, ignition timing etc. The engine operation conditions may be related to a cylinder specific and/or engine specific parameter.

In some embodiments, a characteristic or key number indicative of the determined engine operation conditions may be determined in step 106.

Furthermore, during normal operation of the internal combustion engine 1, additionally an actual risetime duration CR of the spark plug 30 is determined (step 108). In some embodiments, a plurality of actual risetime durations CR of subsequent ignition/combustion cycles are determined, and an average value (for example, floating average, arithmetic average, etc.) for the actual risetime duration CR is calculated. For example, 10 to 100 actual risetime durations CR determined at comparable engine operation conditions may be averaged to reduce the impact of outliers.

The actual risetime duration CR is determined for each cylinder 4 separately. The plurality of actual risetime durations CR may be saved in a memory for further processing, for example by control unit 50.

In decision 110 it is determined whether the actual (average) risetime duration CR is smaller than the second reference risetime duration RR2. In case the actual risetime duration CR is smaller than the second reference risetime duration RR2, the method proceeds to steps 112 and 114, which represent exemplary preset methods for testing operability of the spark plug 30. On the other hand, in case the actual risetime duration CR is greater than the second reference risetime duration RR2, the method proceeds to step 116.

In case of the actual risetime duration CR being shorter than the second reference risetime duration RR2 a situation occurs, in which rising of a primary current of the ignition coil 54 terminates earlier in normal operation than in purge operation. As described above, the second reference risetime duration RR2 is considered as the quasi-optimal risetime duration during operation. Risetime durations being shorter than the second reference risetime duration RR2 indicate that a failure in the ignition system 56 or an abnormal behavior of the spark plug 30 occurred. Further examples of an abnormal behavior of the spark plug 30 include a determination that a required secondary breakdown voltage 62 of the ignition coil 54 is lower in normal operation than a second reference breakdown voltage 62 determined analogous to the second reference risetime duration RR2 during the engine purge operation mode. For example, such a situation may occur, when there is a pearl formation on the electrodes of the spark plug 30 due to accumulation of molten metal of the electrode. Such an accumulation may reduce the electrode gap and lead to abnormality in operation. A further electrical parameter associated with an operation of the ignition system 56, which can be monitored to determine a spark plug state, is the secondary current.

To pinpoint the failure of the abnormal behavior of the spark plug 30, a sparkability test 112 and/or an ignitability test 114 may be performed.

The sparkability test 112 includes actuating the spark plug 30 at a preset sparkability test ignition timing. The preset sparkability test ignition timing is shifted towards earlier relative to the ignition timing used during determination of the actual risetime duration CR. In other words, the preset sparkability test ignition timing is before the ignition timing of the spark plug 30 during normal operation (during determination of the actual risetime duration CR in step 108). As the spark plug 30 is actuated at the preset sparkability test ignition timing, it is determined whether an ignition is caused by the spark plug 30 or not. For example, parameters relating to an ignition angle, temperature or a pressure of a combustion chamber (the pre-chamber 34 or the main combustion chamber 8) associated with the spark plug 30 may be monitored to determine whether a combustion, and thus an ignition, occurred. Additionally or alternatively, at least one electrical parameter associated with an operation of the spark plug 30 may be monitored to determine if a spark is generated between the electrodes of the spark plug 30.

The concept of shifting the ignition timing towards earlier of the exemplary sparkability test is based on the following consideration. The pressure and density in between the electrodes of the spark plug 30 is lower at earlier timings before top dead center (TDC) as the piston 2 is moving upwards and the air (or fuel air mixture) is less compressed compared to the positions beyond this point towards TDC. As a result, it is generally easier to generate a spark between electrodes of the spark plug 30. In case it is possible to observe a combustion and generate a spark when actuating the spark plug 30 earlier, although it was not possible to generate a spark at a later timing, it can be determined that for an operation point with higher densities and pressures, the spark plug 30 cannot be reliably operated. For example, breakdown voltage required by the spark plug 30 owing to larger electrode wear for generating a spark at higher densities and pressures may be too large for the given configuration of the ignition system 56. On the other hand, in case it is not possible to generate a spark (observe a combustion) when actuating the spark plug 30 earlier, it can be determined that for an operation point of lower densities and pressures, the spark plug 30 cannot be reliably operated as well. For example, electrode wear of the spark plug 30 may be already too large even for generating a spark at lower densities and pressures, or any other failure of the spark plug 30 preventing the generation of a spark may occur irrespective of the operating conditions.

In some embodiments, the ignition timing may be shifted towards earlier (the preset sparkability test ignition timing may be before the normal ignition timing) within a range between 0° (crank angle) and about 20°, particularly, within a range between about 5° and about 10°. Generally, the normal ignition timing may be within a range between about 40° BTDC (before top dead center) and about 10° ATDC (after top dead center).

In the following, the term "positive outcome of the sparkability test" refers to a situation, in which a combustion is observed at the preset sparkability test ignition timing. The term "negative outcome of the sparkability test" or "reduced sparkability of the spark plug" refers to a situation, in which no combustion is observed at the preset sparkability test ignition timing.

The ignitability test 114 includes actuating the spark plug 30 at a preset ignitability test ignition timing. The preset ignitability test ignition timing is shifted towards later relative to the ignition timing used during determination of the actual risetime duration CR. In other words, the preset ignitability test ignition timing is after the ignition timing of the spark plug 30 during normal operation (during determination of the actual risetime duration CR in step 108). As the spark plug 30 is actuated at the preset ignitability test ignition timing, it is determined whether an ignition is caused by the spark plug 30 or not. For example, parameters relating to a temperature or a pressure of a combustion chamber (the pre-chamber 34 or the main combustion chamber 8) associated with the spark plug 30 may be monitored to determine whether a combustion, and thus an ignition, occurred. Additionally or alternatively, at least one electrical parameter associated with an operation of the spark plug 30 may be monitored to determine if a spark is generated between the electrodes of the spark plug 30.

The concept of shifting the ignition timing towards later (closer to TDC) of the exemplary ignitability test is based on the following consideration. In order to obtain an ignition, a fuel air mixture needs to have an air to fuel ratio within a desired range. In case of excess of fuel, or excess of air, it may happen that is not possible to ignite or burn the mixture even if a spark is generated. By shifting the ignition timing towards later, an attempt is made to change the mixture properties in between the electrodes of the spark plug 30 by pushing more and more fresh mixture in direction to the electrodes of the spark plug 30 by moving the piston 2 towards TDC, thereby, increasing the chance of pushing away inert residual gas of former combustion cycles. In case an ignition or a combustion is observed at the later timing, it can be determined that a spark is generated and the spark plug 30 is still functional. To ensure combustion also at the normal ignition timing, mixture properties of the fuel air mixture may have to be changed. On the other hand, in case no ignition or combustion is observed at the later timing, it can be determined that the mixture properties are not the reason for the misfire or the abnormal behavior of the spark plug 30.

The results of the determination whether a combustion occurs/a spark is generated at the preset sparkability test ignition timing and the preset ignitability test ignition timing may be saved in a memory of the control unit 50.

In some embodiments, the ignition timing may be shifted towards later (the preset ignitability test ignition timing may be after the normal ignition timing) within a range between 0° and about 20°, particularly about 5° to about 10°. In the following, the term "positive outcome of the ignitability test" refers to a situation, in which a combustion is observed at the preset ignitability test ignition timing. The term "negative outcome of the ignitability test" or "reduced ignitability of the fuel air mixture" refers to a situation, in which no combustion is observed at the preset ignitability test ignition timing.

In case the actual risetime duration CR is not smaller than the reference risetime duration RR2 (decision 110), the method proceeds to step 116. Here, the current spark plug state, is determined. Specifically, the control unit 50 may determine the state of the spark plug 30 based on a map stored in a memory of the control unit 50. The map may include empirically determined spark plug states, for example extents of electrodes gaps, based on engine operation conditions and risetime durations. Particularly, the engine operation condition(s) (or the characteristic value) determined in step 106 and the current risetime duration CR determined in step 108 may serve as input values for the map, which outputs a corresponding spark plug state based on empirical data. The map may be in the form of tables, graphs and/or equations, and may include a compilation of data collected from lab and/or field operation or simulations of the internal combustion engine 1.

Information on the current spark plug state may be used by operators to determine service and maintenance intervals for the spark plug 30. Additionally, based on the determined spark plug state, a remaining extent of the service life of the spark plug 30 may be estimated, for example, based on corresponding maps stored in the memory of the control unit 50. For estimating the remaining extent of the service life of the spark plug 30, in some embodiments, historical data relating to previous spark plug states of the same spark plug and/or of other spark plugs may be used.

The method may proceed to decision 118. Here, it is checked whether a misfire (no combustion) occurs in one specific cylinder 4. The misfire may be detected, for example, based on in-cylinder temperature deviations, in-cylinder pressure deviations, engine speed changes, and/or outputs of a detonation sensor, ion sensing, etc. In case no misfire occurs, the method loops back to steps 106 and 108. On the other hand, in case it is determined that misfire occurs, the method proceeds to a preset spark plug test procedure, for example the sparkability test 120 and the ignitability test 122 to determine why no combustion occurred during the operating cycle. Specifically, it may be checked whether the misfire is caused by unavailability of a combustible or ignitable mixture in between the electrodes of the spark plug 30 (ignitability test 122), or whether the misfire is caused by a failure to generate a spark between the electrodes of the spark plug 30 (sparkability test 120).

To pinpoint the failure of the misfire, a sparkability test 120 and/or an ignitability test 122 may be performed. The sparkability and ignitability tests 120 and 122 are performed in accordance with the sparkability and ignitability tests 112 and 114, respectively, already described herein.

The results of the sparkability tests 112, 120 and the ignitability tests 114 and 122 are processed by the control unit 50 which responsively determines the ignition system state and controls the operation of the internal combustion engine 1 to adapt an engine operation if necessary (step 124).

For example, in step 124, in case a situation occurs, in which a sparkability test having a positive outcome (combustion observed) and an ignitability test having a negative outcome (no combustion observed), the control unit 50 may reduce power of the internal combustion engine 1, change an ignition angle, change an air fuel ratio of at least the cylinder 4 associated with the corresponding spark plug 30, etc.

As another example, in step 124 in case a situation occurs, in which a sparkability test has a negative outcome and an ignitability test has a positive outcome, the control unit 50 may also reduce a load of the affected cylinder 4 or all cylinders of the internal combustion engine 1, and the control unit 50 may change an ignition timing of the corresponding spark plug 30 towards earlier. As a result, lower densities around electrodes of the spark plug 30 due to the reduced power of the internal combustion engine land the earlier ignition timing may allow to generate a spark for a spark plug 30 with a high wear (for example, formations of deposits, pearl formation, large electrode gap).

Furthermore, in step 124, in case a situation occurs, in which a sparkability test and an ignitability test have a negative outcome, the control unit 50 may stop operation of the internal combustion engine 1, or may deactivate the affected cylinder 4 or reduce load to a safe level.

Still further, in step 124, in case a situation occurs, in which a sparkability test and an ignitability test have a positive outcome, the control unit 50 may operate the internal combustion engine 1 without any adaption.

After performing step 124, the method loops back to steps 106 and 108 as described before.

It should be noted that the sparkability tests 112, 120 and ignitability tests 114, 122 as disclosed herein shift an ignition timing in opposite directions. Therefore, influences being weakened in one test are intensified in the other test so that a reliable distinction between the determined reason for the abnormal behavior of the spark plug and/or the misfire can be made. Particularly, densities and pressure levels are reduced at the sparkability test ignition timing, and densities and pressure levels are increased at the ignitability test ignition timing.

Furthermore, it should be noted that the method may be performed for each cylinder 4 of the internal combustion engine 1 separately.

It should be appreciated that the above described method is exemplary only. Therefore, the sequence of the method steps may be changed and/or individual method steps may be added or omitted. For example, the current spark plug state (step 116) may be determined before decision 110. As another example further preset spark plug tests may be included to be performed parallel to or instead of the sparkability tests 112, 120 and/or ignitability tests 114, 122. Other means of feedback like secondary voltage may also be used.

INDUSTRIAL APPLICABILITY

The methods and control systems as disclosed herein are applicable in internal combustion engines for monitoring an ignition system and a state of the spark plug. Particularly, the methods and control systems as disclosed herein may be applied in large internal combustion engines, in which combustion processes of the cylinders may be individually controlled so that cylinders having a spark plug with a reduced sparkability can be further operated under low load conditions to maintain an operation of the affected cylinder until the next maintenance. The methods and control systems as disclosed herein may further assist in pinpointing the reason for a misfire and/or an abnormal behavior of a spark plug.

Terms such as "about", "around", "approximately", or "substantially" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar as such variations are appropriate to perform in the disclosed invention. It is to be understood that the value to which the modifier "about" refers is itself also specifically, and preferably, disclosed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

What is claimed is:

1. A method for monitoring an ignition system including a spark plug of an internal combustion engine, the method comprising:
   determining an operation value associated with an electrical parameter indicative of an operation of the ignition system during actuation of the spark plug;
   determining at least one engine parameter indicative of a current engine operation condition of the internal combustion engine;
   determining a current spark plug state of the spark plug based on the at least one engine parameter and the operation value associated with the electrical parameter of the ignition system; and
   performing a preset spark plug test procedure for testing operation of the spark plug.

2. The method of claim 1, wherein the step of determining the current spark plug state uses a map providing a plurality of empirically determined spark plug states, each spark plug state of the plurality of empirically determined spark plug states depending on a specific combination of the at least one determined engine parameter and the determined operation value associated with the electrical parameter of the spark plug.

3. The method of claim 1, wherein the determined operation value is an actual risetime duration of a primary current of an ignition coil of the ignition system.

4. The method of claim 1, wherein the preset spark plug test procedure is performed when misfire occurs and/or the determined operation value associated with the electrical parameter indicative of the operation of the ignition system indicates an abnormal behavior of the spark plug.

5. The method of claim 1, wherein the preset spark plug test procedure comprises a sparkability test including:
   determining that misfire and/or an abnormal behavior of the spark plug occurs for a first ignition timing of the spark plug;
   actuating the spark plug at a preset sparkability test ignition timing before the first ignition timing; and
   when misfire occurs, determining that the spark plug has a reduced sparkability.

6. The method of claim 1, wherein the preset spark plug test procedure comprises an ignitability test including:
   determining that misfire and/or an abnormal behavior of the spark plug occurs for a first ignition timing of the spark plug;
   actuating the spark plug at a preset ignitability test ignition timing after the first ignition timing; and
   when misfire occurs, determining that a fuel air mixture has a reduced ignitability.

7. The method of claim 1, further comprising adapting an operation of the internal combustion engine when the preset spark plug test procedure indicates that a fuel air mixture has a reduced ignitability and/or the preset spark plug test procedure indicates that the spark plug has a reduced sparkability.

8. The method of claim 1, further comprising determining a reference value associated with the electrical parameter indicative of an operation of the ignition system during actuation of the spark plug,
   wherein the reference value is determined during an operation of the internal combustion engine with compression and without combustion, and
   wherein the preset spark plug test procedure is performed when a comparison between the reference value and the operation value indicates an abnormal behavior of the spark plug.

9. The method of claim 8, wherein
   the reference value is a first risetime duration of a primary current of an ignition coil of the ignition system;
   the operation value is a second risetime duration of a primary current of the ignition coil; and
   the abnormal behavior of the spark plug includes a determination that the operation value is smaller than the reference value.

10. The method of claim 8, wherein
    the reference value is a first voltage amount of a secondary breakdown voltage of an ignition coil associated with the spark plug;
    the operation value is a second voltage amount of a secondary breakdown voltage of the ignition coil associated with the spark plug; and
    the abnormal behavior of the spark plug includes a determination that the operation value is smaller than the reference value.

11. The method of claim 1, wherein:
    the step of determining the operation value includes determining a plurality of operation values and averaging the plurality of operation values; and/or
    the operation value is determined during an operation of the internal combustion engine including compression and combustion.

12. The method of claim 1, further comprising:
    determining that misfire occurs based on measurements of in-cylinder temperature, in-cylinder pressure, engine speed changes, ion sensing, and/or a detonation sensor.

13. An ignition system for an internal combustion engine, the ignition system comprising:
    at least one spark plug;
    an ignition coil for the at least one spark plug; and
    a control unit electronically connected to the ignition coil and configured to:
       determine an operation value associated with an electrical parameter indicative of an operation of the ignition system during actuation of the at least one spark plug;
       determine at least one engine parameter indicative of a current engine operation condition of the internal combustion engine; and
       determine a current spark plug state of the at least one spark plug based on the at least one engine parameter and the operation value associated with the electrical parameter of the ignition system, wherein the operation value is an actual risetime duration (CR) of a primary current of the ignition coil of the ignition system.

14. A computer program comprising computer-executable instructions which, when run on a computer, cause the computer to perform the steps of:
    determining an operation value associated with an electrical parameter indicative of an operation of an ignition system of an internal combustion engine during actuation of a spark plug of the internal combustion engine;
    determining at least one engine parameter indicative of a current engine operation condition of the internal combustion engine;
    determining a current spark plug state of the spark plug based on the at least one engine parameter and the operation value associated with the electrical parameter of the ignition system; and
    performing a preset spark plug test procedure for testing operation of the spark plug.

15. The ignition system of claim 13, wherein the control unit is further configured to perform a preset spark plug test procedure for testing operation of the at least one spark plug.

16. The ignition system of claim 15, wherein the preset spark plug test procedure is performed when misfire occurs and/or the operation value associated with the electrical parameter indicative of the operation of the ignition system indicates an abnormal behavior of the spark plug.

17. The ignition system of claim 15, wherein the preset spark plug test procedure comprises a sparkability test including:
    determining that misfire and/or an abnormal behavior of the spark plug occurs for a first ignition timing of the spark plug;
    actuating the spark plug at a preset sparkability test ignition timing before the first ignition timing; and
    when misfire occurs, determining that the spark plug has a reduced sparkability.

18. The ignition system of claim 15, wherein the preset spark plug test procedure comprises an ignitability test including:
    determining that misfire and/or an abnormal behavior of the spark plug occurs for a first ignition timing of the spark plug;
    actuating the spark plug at a preset ignitability test ignition timing after the first ignition timing; and
    when misfire occurs, determining that a fuel air mixture has a reduced ignitability.

19. The ignition system of claim 15, wherein the control unit is further configured to adapt an operation of the internal combustion engine when the preset spark plug test procedure indicates that a fuel air mixture has a reduced ignitability and/or the preset a spark plug test procedure indicates that the spark plug has a reduced sparkability.

20. The ignition system of claim 15, wherein the control unit is further configured to determine a reference value associated with the electrical parameter indicative of an operation of the ignition system during actuation of the spark plug, wherein the reference value is determined during an operation of the internal combustion engine with compression and without combustion, and wherein the preset spark plug test procedure is performed when a comparison between the reference value and the operation value indicates an abnormal behavior of the spark plug.

* * * * *